(12) United States Patent
Ganapathy et al.

(10) Patent No.: US 9,105,892 B2
(45) Date of Patent: Aug. 11, 2015

(54) ADAPTIVE METHOD FOR CONVERSION OF EXTERNAL POWER REQUEST TO CURRENT SETPOINT TO A FUEL CELL SYSTEM BASED ON STACK PERFORMANCE

(75) Inventors: Sriram Ganapathy, Rochester, NY (US); Kiran Mallavarapu, Honeoye Falls, NY (US); Stefan W. Lixfeld, Wiesbaden (DE); Manish Sinha, Pittsford, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1465 days.

(21) Appl. No.: 12/724,262

(22) Filed: Mar. 15, 2010

(65) Prior Publication Data

US 2011/0223505 A1    Sep. 15, 2011

(51) Int. Cl.
 *H01M 8/04* (2006.01)
 *H01M 8/10* (2006.01)

(52) U.S. Cl.
 CPC ........ *H01M 8/04559* (2013.01); *H01M 8/0491* (2013.01); *H01M 8/04589* (2013.01); *H01M 8/04604* (2013.01); *H01M 8/04992* (2013.01); *H01M 2008/1095* (2013.01); *Y02E 60/50* (2013.01)

(58) Field of Classification Search
 CPC ................ H01M 2008/1095; H01M 8/04559; H01M 8/04589; H01M 8/04604; H01M 8/0491; H01M 8/04992; Y02E 60/50
 See application file for complete search history.

(56) References Cited

U.S. PATENT DOCUMENTS

| 6,794,844 B2* | 9/2004 | Hochgraf et al. | 320/101 |
| 8,214,174 B2* | 7/2012 | Ganapathy et al. | 702/179 |
| 2008/0076012 A1* | 3/2008 | Lienkamp et al. | 429/65 |

OTHER PUBLICATIONS

"A semi-empirical model of the direct methanol fuel cell performance Part I. Model development and Verification", Argyropoulos et al., J. of Power Sources 123 (2003) 190-199.*
"A semi-empirical model of the direct methanol fuel cell Part II: Parametric analysis", Scott et al., J. of Power Sources 161 (2006) 885-892.*
"Mathematical modeling of polymer electrolyte fuel cells", Sousa et al., Journal of Power Sources 147 (2005) 32-45.*
"The voltage-current curve of a polymer electrolyte fuel cell: "exact" and fitting equations", Kulikovsky, Electrochemistry Communications 4 (2002) 845-852.*
Rotary-gradient fitting algorithm for polarization curves of Proton Exchange Membrane Fuel Cells (PEMFCs), Guinea et al., International J. of Hydrogen Energy 33 (2008) 2774-2782.*

(Continued)

*Primary Examiner* — Carlos Barcena
(74) *Attorney, Agent, or Firm* — John A. Miller; Miller IP Group, PLC

(57) ABSTRACT

A system and method for converting a fuel cell stack power request signal to a stack current set-point that considers stack performance parameters. The method includes obtaining a power-current relationship curve of the fuel cell stack to provide stack parameters including exchange current density and mass transfer coefficient. The method then calculates a slope for the stack using the parameters from the power-current relationship curve estimation that includes calculating a cell voltage at two predetermined stack current densities. The method then calculates a change in current in response to the power request signal, the stack voltage, the stack current and the calculated slope, and uses the change in current to update the current set-point for the stack.

19 Claims, 3 Drawing Sheets

(56) References Cited

OTHER PUBLICATIONS

"Current density and Electrode Structure", Liebhafsky et al., Ch. 10, p. 116-140, in "Fuel Cell Systems", Young et al., Advances in Chemistry, American Chemical Society (1969).*

"Dynamic behavior of a PEM fuel cell stack for stationary applications", by Hamelin et al., International Journal of Hydrogen Energy, 26 (2001) 625-629 (Hamelin),.*

"Modeling and Control for PEM Fuel Cell Stack System", by Pukrushpan et al., 2002 American Control Conference, TP09-2 (Pukrushpan).*

* cited by examiner

US 9,105,892 B2

ADAPTIVE METHOD FOR CONVERSION OF EXTERNAL POWER REQUEST TO CURRENT SETPOINT TO A FUEL CELL SYSTEM BASED ON STACK PERFORMANCE

BACKGROUND OF THE INVENTION

1. Field of the Invention

This invention relates generally to a system and method for converting a power request signal for a fuel cell stack to a current set-point for the stack and, more particularly, to a system and method for converting a power request signal for a fuel cell stack to a current set-point for the stack that considers stack performance.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The stack controller needs to know the current/voltage relationship, referred to as a polarization curve, of the fuel cell stack to schedule stack reactant flows in accordance with power demands. The relationship between the voltage and the current of the stack is typically difficult to define because it is non-linear, and changes depending on many variables, including stack temperature, stack partial pressures and cathode and anode stoichiometries. Additionally, the relationship between the stack current and voltage changes as the stack degrades over time. Particularly, an older stack will have lower cell voltages, and will need to provide more current to meet the power demands than a new, non-degraded stack.

When the stack controller receives a power request signal from the vehicle operator, a control algorithm generates a current set-point for the fuel cell stack. In known systems, that current set-point is based on the stack polarization curve where it is assumed that the polarization curve is linear. Typically, only a single polarization curve is used for the fuel cell stack and that polarization curve is one that is determined for the beginning of life (BOL) of the fuel cell stack. However, as the stack ages, voltage degradation occurs in the stack where a higher stack voltage is required for a higher stack current. Thus, an increase in power request requires a higher current set-point. Further, external disturbances on the system cause voltage oscillations on the stack which translate to oscillations in the current set-point signal.

SUMMARY OF THE INVENTION

In accordance with the teachings of the present invention, a system and method are disclosed for converting a fuel cell stack power request signal to a stack current set-point that considers stack performance parameters. The method includes obtaining a power-current relationship curve of the fuel cell stack to provide stack parameters including exchange current density and mass transfer coefficient. The method then calculates a slope for the stack using the parameters from the power-current relationship curve estimation that includes calculating a cell voltage at two predetermined stack current densities. The method then calculates a change in current in response to the power request signal, the stack voltage, the stack current and the calculated slope, and uses the change in current to update the current set-point for the stack.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining a current set-point for a fuel cell stack that considers stack performance parameters is merely exemplary in nature, and is in no way intended to limit the invention or it's applications or uses.

Figure 1:
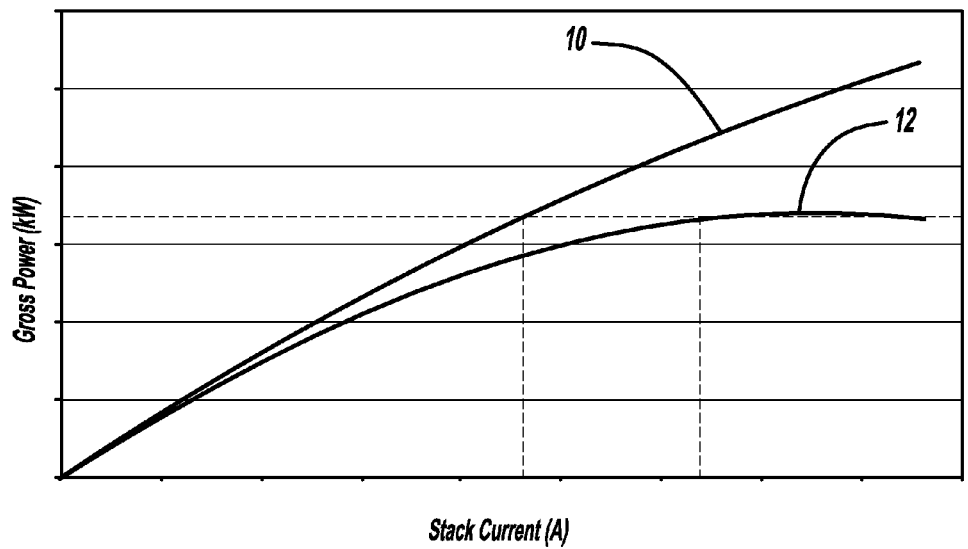
FIG. 1 is a graph with stack current on the horizontal axis and stack power on the vertical axis showing a polarization curve for a fuel cell stack at the beginning of stack life and a power-current relationship curve for a fuel cell stack at the end of stack life.

FIG. 1 is a graph with stack current on the horizontal axis and stack power on the vertical axis. A power-current relationship curve 10 for a typical fuel cell stack at the beginning of the life of the stack and a typical power-current relationship curve 12 for a fuel cell stack at the end of the life of the stack are shown. As is apparent, the curve 10 is nearly linear where as the requested power goes up, an increase in the current set-point for the fuel cell stack would also go up. However, as illustrated, a typical power request (dotted line) would result in about a lower current set-point for the stack at the beginning of its life and a higher current set-point for the stack at the end of its life because of loss of voltage.

Figure 2:
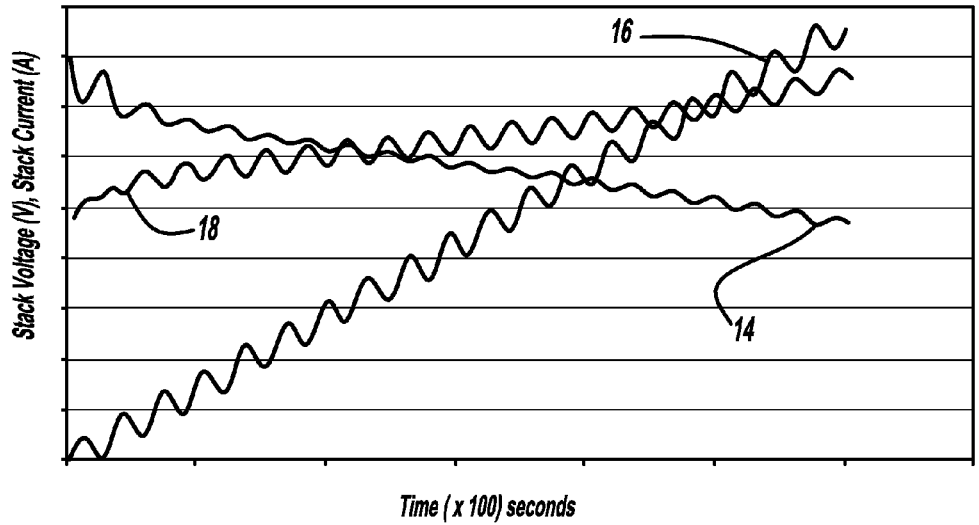
FIG. 2 is a graph with time on the horizontal axis and stack voltage and current on the vertical axis showing oscillations on stack voltage and stack current.

FIG. 2 is a graph with time on the horizontal axis and stack voltage and stack current on the vertical axis. Graph line 14 represents the voltage of the stack over some time period, which shows that external oscillations occur on the voltage as a result of many factors. These voltages translate into a stack current on line 16 having oscillations, which provides a direct stack current set-point oscillation as identified by line 18.

As will be discussed in detail below, the present invention proposes an algorithm that provides a process for generating a more accurate current set-point for a fuel cell stack based on a power request signal over the entire life of the stack that removes the oscillations in the current set-point that may occur as a result of external voltage oscillations of the fuel cell stack.

Figure 3:
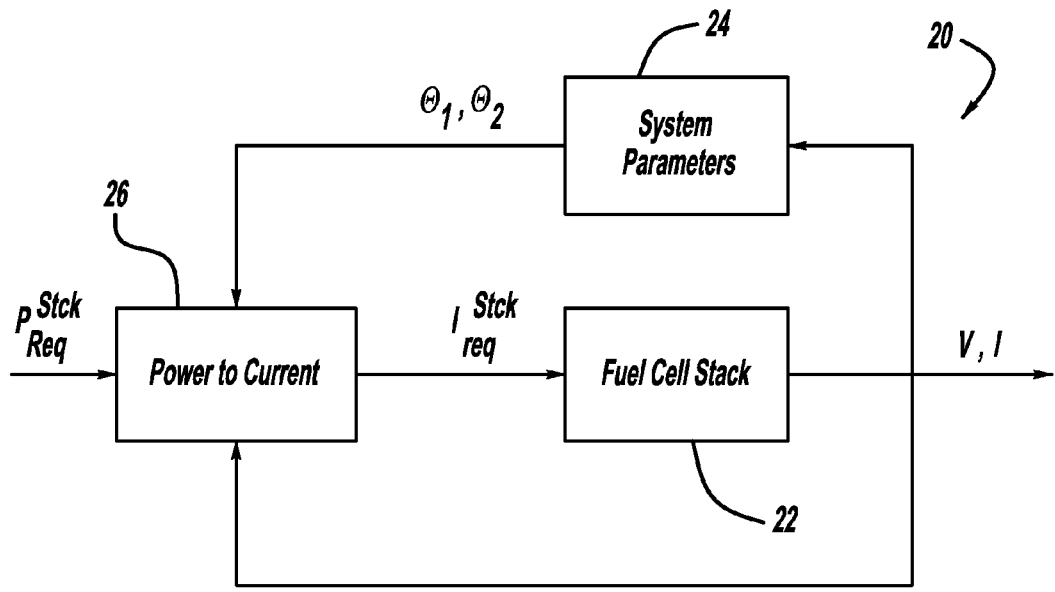
FIG. 3 is a block diagram of a fuel cell system employing a power-to-current conversion algorithm.

FIG. 3 is a block diagram of a fuel cell system 20 including a fuel cell stack 22. System parameters are stored at box 24 including values $\theta_1$ and $\theta_2$, defined below. The system parameters are provided to a power-to-current conversion processor 26 that also receives a stack power request signal $P_{Req}^{Stck}$. The power-to-current conversion processor 26 converts the power request signal $P_{Req}^{Stck}$ to a current request signal $I_{Req}^{Stck}$ using the values $\theta_1$ and $\theta_2$, where the current request signal $I_{Req}^{Stck}$ is the current set-point for the fuel cell stack 22, as will be discussed in detail below. The current set-point signal $I_{Req}^{Stck}$ applied to fuel cell stack 22 generates a stack voltage V and a stack current I that are sent back to the power-to-current conversion processor 26.

Figure 4:
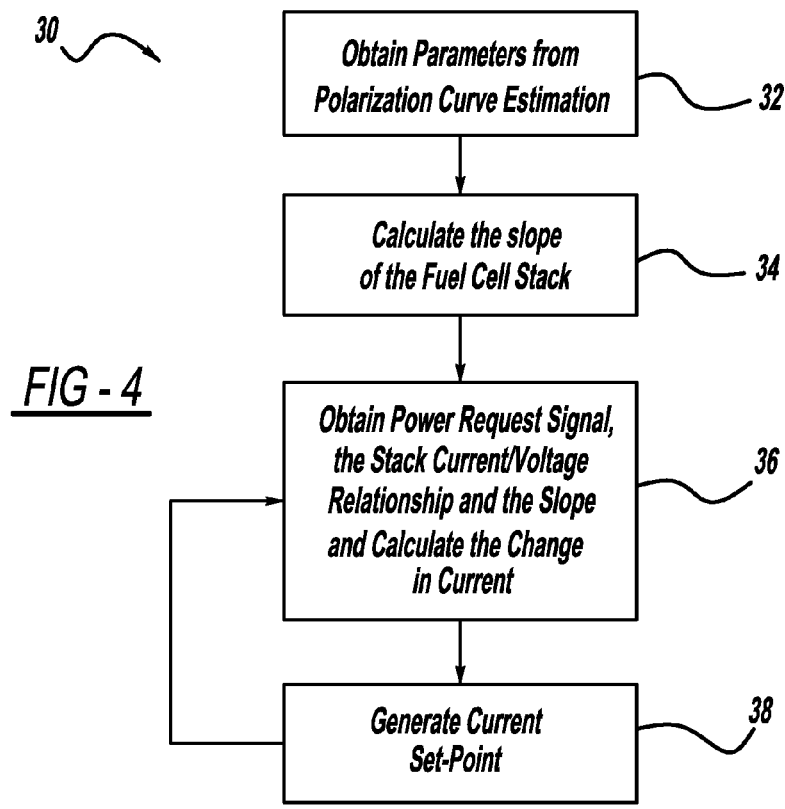
FIG. 4 is a flow chart diagram showing a process for generating a stack current set-point for a stack power request signal.

FIG. 4 is a flow chart diagram 30 showing a process performed in the processor 26 for generating the current set-point signal $I_{Req}^{Stck}$, according to the invention. At box 32, the algorithm obtains parameters from a power-current relationship curve estimation of the fuel cell stack 22. In one embodiment, these parameters are the values $\theta_1$ and $\theta_2$, and are known as exchange current density and mass transfer coefficient, respectively. A detailed discussion of a system and method for estimating a power-current relationship curve including determining the exchange current density and the mass transfer coefficient can be found in U.S. patent application Ser. No. 11/669,898, filed Jan. 31, 2007, titled Algorithm For Online Adaptive Polarization Curve Estimation of a Fuel Cell Stack, assigned to the assignee of the application and herein incorporated by reference.

Figure 5:
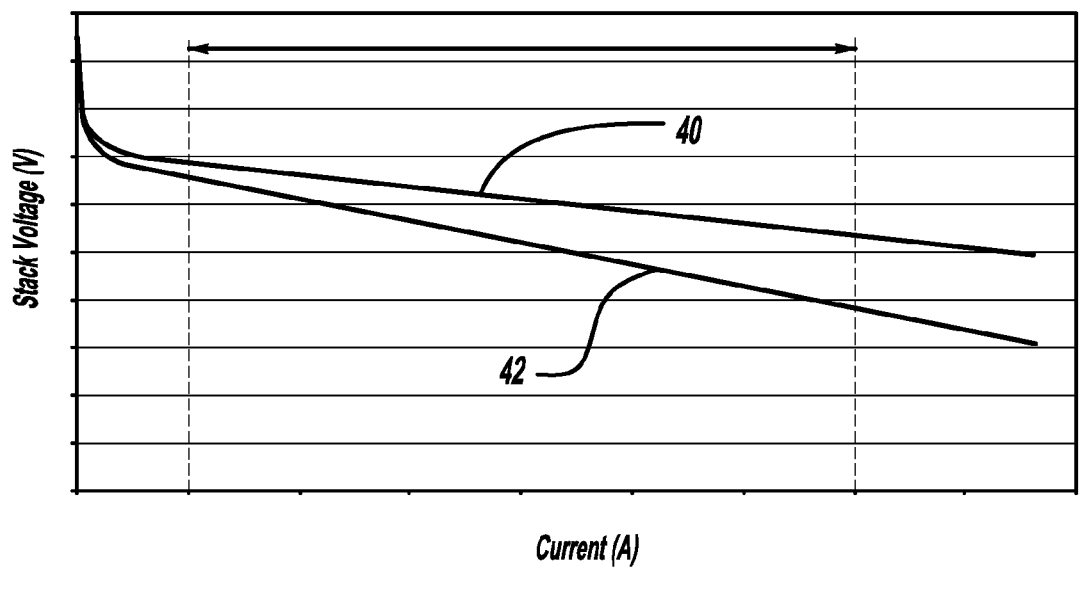
FIG. 5 is a graph with stack current on the horizontal axis and stack voltage on the vertical axis showing power-current relationship curves for calculating slope based on stack life.

At box 34, the power-to-current conversion algorithm calculates the slope R of the power-current relationship curve for the fuel cell stack 22 based on the life of the stack 22. FIG. 5 is a graph with current on the horizontal axis and stack voltage on the vertical axis showing the slope R for the stack 22 based on stack life, where line 40 is the beginning of life of the stack 22 and line 42 is the end of life of the stack 22. The slope R of the power-current relationship curve of the stack 22 is calculated by using a voltage prediction algorithm to calculate the cell voltage $E_{cell}$ at two predefined current densities along the line, for example, at 0.1 A/cm$^2$ and 1.0 A/cm$^2$. In one non-limiting embodiment, the cell voltage $E_{cell}$ is calculated as:

$$E_{cell} = E_{rev} - (j+a)*R_{HFR} - \left(0.07*\log_{10}\left(\frac{j+a}{j^0}\right) + c\log_{10}\left(1 - \frac{j}{j^\infty}\right)\right)$$

Where,
$E_{cell}$ is the cell voltage (V),
j is stack current density (A/cm$^2$),
$R_{HFR}$ is cell HFR resistance (ohm cm$^2$),
$E_{rev}$ is a thermodynamic reversible cell potential (V),
a is the background current density from cell shorting/cell crossover (A/cm$^2$),
$j^0$ ($\theta_1$) is the exchange current density (A/cm$^2$),
$j^\infty$ is a limiting current density (A/cm$^2$), and
c ($\theta_2$) is the mass transfer coefficient.

The fuel cell resistance value $R_{HFR}$ defines a high frequency resistance on the fuel cell stack that gives an indication of stack relative humidity. The fuel cell resistance value $R_{HFR}$ can be a measured value or a model value, as is well understood to those skilled in the art. In the model, the fuel cell resistance value $R_{HFR}$ can be calculated as a function of stack inlet and outlet temperature and relative humidity of the cathode gas, which is also a function of inlet and outlet temperature, pressure and flow rate. Therefore, the fuel cell resistance value $R_{HFR}$ represents the stack operating conditions including temperature, pressure and cathode flow rate.

After obtaining two cell voltage values for two stack current densities, the slope R of the line can be calculated. Thus, as stack performance degrades with time, the slope R will also change to account for stack degradation.

At box 36, the algorithm obtains the power request signal $P_{Req}^{Stck}$, the stack current/voltage relationship (polarization curve) and the slope R, and calculates a change in the current of the stack 22. This step involves calculating an increment to the current set-point calculation that uses the slope R from the box 34, the power request signal $P_{Req}^{Stck}$, the current request $I_{req}$, voltage feedback $V_t$ from the stack 22 and current feedback $I_t$ from the stack 22 at time t to calculate a change in stack current $\Delta I$ at the next time step to meet the power request. In one embodiment, the following equation is used to calculate the change in current $\Delta I$.

$$\Delta I = \frac{[V_t - RI_{(t)} + 2R(I_{(t)} - I_{Req(t)}) - \sqrt{(V_t + RI_{(t)})^2 - 4*R*P_{Req(t+1)}}]}{2R}$$

At box 38, the power-to-current conversion algorithm calculates the current set-point signal $I_{req}^{Stck}$ by:

$$I_{req}^{Stck} = I_{Req(t+1)} = I_{Req(t)} + \Delta I$$

The power-to-current conversion algorithm will continually update the current set-point signal $I_{req}^{Stck}$ at the box 36 at a faster rate than the calculation of the slope R of the stack 22 based on estimations of the power-current relationship curve over time.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a current set-point for a fuel cell stack, said method comprising:
a controller of a fuel cell system programmed to control the fuel cell stack by:
estimating a power-current relationship curve of the fuel cell stack;
providing parameters from the power-current relationship curve estimation;
calculating a slope for the stack based on the life of the stack using the parameters from the power-current relationship curve estimation, wherein the slope changes as the stack degrades with time;
calculating a change in current in response to a power request signal, stack voltage, stack current and the calculated slope;
generating the current set-point based on the change in current; and
recalculating the change in current and regenerating the current set-point based on the change in current, wherein the current set-point is continually regenerated over the life of the fuel cell stack such that oscillations in the current set-point caused by external voltage oscillations of the fuel cell stack are removed.

2. The method according to claim 1 wherein providing parameters from the power-current relationship curve estimation includes obtaining an exchange current density and a mass transfer coefficient.

3. The method according to claim 2 wherein calculating a slope for the stack includes calculating a cell voltage at two predetermined stack current densities.

4. The method according to claim 3 wherein calculating the cell voltage uses the equation:

$$E_{cell} = E_{rev} - (j+a)*R_{HFR} - \left(0.07*\log_{10}\left(\frac{j+a}{j^0}\right) + c\log_{10}\left(1-\frac{j}{j^\infty}\right)\right)$$

where $E_{cell}$ is the cell voltage (V), j is current density (A/cm$^2$), $R_{HFR}$ is cell HFR resistance (ohm cm$^2$), $E_{rev}$ is thermodynamic reversible cell potential (V), a is background current density from cell shorting/cell crossover (A/cm$^2$), j$^0$ is exchange current density (A/cm$^2$), j$^\infty$ is the limiting current density (A/cm$^2$) and c is the mass transfer coefficient.

5. The method according to claim 3 wherein the predetermined current densities are 0.1 A/cm$^2$ and 1.0 A/cm$^2$.

6. The method according to claim 1 wherein calculating a change in current includes using the equation:

$$\Delta I = \frac{\left[V_t - RI_{(t)} + 2R(I_{(t)} - I_{Req(t)}) - \sqrt{(V_t + RI_{(t)})^2 - 4*R*P_{Req(t+1)}}\right]}{2R}$$

where $\Delta I$ is the change in current, $V_t$ is the stack voltage, $I_{(t)}$ the stack current, R is the slope and $P_{Req}$ is the power request signal.

7. The method according to claim 1 wherein generating the current set-point uses the equation:

$$I_{req}^{Stck} = I_{Req(t+1)} = I_{Req(t)} + \Delta I$$

where $I_{req}^{Stck}$ is the current set-point, $I_{Req}$ is a previous current set-point and $\Delta I$ is the change in current.

8. A method for determining a current set-point for a fuel cell stack, said method comprising:
a controller of a fuel cell system programmed to control the fuel cell stack by:
estimating a power-current relationship curve of the fuel cell stack that changes over the life of the stack;
providing an exchange current density and a mass transfer coefficient value from the power-current relationship curve estimation;
calculating a slope for the stack based on the life of the stack using the exchange current density, the mass transfer coefficient, stack voltage, stack current and a power request signal, wherein calculating the slope of the stack includes calculating a cell voltage at two predetermined stack current densities;
calculating a change in current in response to the power request signal, the stack voltage, the stack current and the calculated slope;
generating the current set-point based on the change in current; and
recalculating the change in current and regenerating the current set-point based on the change in current, wherein the current set-point is continually regenerated over the life of the fuel cell stack such that oscillations in the current set-point caused by external voltage oscillations of the fuel cell stack are removed.

9. The method according to claim 8 wherein calculating the cell voltage uses the equation:

$$E_{cell} = E_{rev} - (j+a)*R_{HFR} - \left(0.07*\log_{10}\left(\frac{j+a}{j^0}\right) + c\log_{10}\left(1-\frac{j}{j^\infty}\right)\right)$$

where $E_{cell}$ is the cell voltage (V), j is current density (A/cm$^2$), $R_{HFR}$ is cell HFR resistance (ohm cm$^2$), $E_{rev}$ is thermodynamic reversible cell potential (V), a is background current density from cell shorting/cell crossover (A/cm$^2$), j$^0$ is exchange current density (A/cm$^2$), j$^\infty$ is the limiting current density (A/cm$^2$) and c is the mass transfer coefficient.

10. The method according to claim 8 wherein the predetermined current densities are 0.1 A/cm$^2$ and 1.0 A/cm$^2$.

11. The method according to claim 8 wherein calculating a change in current includes using the equation:

$$\Delta I = \frac{\left[V_t - RI_{(t)} + 2R(I_{(t)} - I_{Req(t)}) - \sqrt{(V_t + RI_{(t)})^2 - 4*R*P_{Req(t+1)}}\right]}{2R}$$

where $\Delta I$ is the changing current, $V_t$ is the stack voltage, $I_{(t)}$ is the stack current, R is the slope and $P_{Req}$ is the power request signal.

12. The method according to claim 8 wherein generating the current set-point uses the equation:

$$I_{req}^{Stck} = I_{Req(t+1)} = I_{Req(t)} + \Delta I$$

where $I_{req}^{Stck}$ is the current set-point, $I_{Req}$ is a previous current set-point and $\Delta I$ is the change in current.

13. A system for determining a current set-point for a fuel cell stack, said system comprising:
a processor of a fuel cell system that is programmed to control the fuel cell stack by including:
means for estimating a power-current relationship curve of the fuel cell stack;
means for providing parameters from the power-current relationship curve estimation;
means for calculating a slope for the stack based on the life of the stack using the parameters from the power-current relationship curve estimation, wherein the slope changes as the stack degrades with time;

means for calculating a change in current in response to a power request signal, stack voltage, stack current and the calculated slope;

means for generating the current set-point based on the changing current; and means for recalculating the change in current and regenerating the current set-point based on the change in current.

14. The system according to claim 13 wherein the means for providing parameters from the power-current relationship curve estimation provides an exchange current density and a mass transfer coefficient.

15. The system according to claim 14 wherein the means for calculating a slope for the stack calculates a cell voltage at two predetermined stack current densities.

16. The system according to claim 15 wherein the means for calculating a slope calculates the cell voltage using the equation:

$$E_{cell} = E_{rev} - (j+a) * R_{HFR} - \left(0.07 * \log_{10}\left(\frac{j+a}{j^0}\right) + c\log_{10}\left(1 - \frac{j}{j^\infty}\right)\right)$$

where $E_{cell}$ is the cell voltage (V), j is current density (A/cm$^2$), $R_{HFR}$ is cell HFR resistance (ohm cm$^2$), $E_{rev}$ is thermodynamic reversible cell potential (V), a is background current density from cell shorting/cell crossover (A/cm$^2$), $j^0$ is exchange current density (A/cm$^2$), $j^\infty$ is the limiting current density (A/cm$^2$) and c is the mass transfer coefficient.

17. The system according to claim 15 wherein the predetermined current densities are 0.1 A/cm$^2$ and 1.0 A/cm$^2$.

18. The system according to claim 13 wherein the means for calculating a change in current uses the equation:

$$\Delta I = \frac{\left[V_t - RI_{(t)} + 2R(I_{(t)} - I_{Req(t)}) - \sqrt{(V_t + RI_{(t)})^2 - 4 * R * P_{Req(t+1)}}\right]}{2R}$$

where $\Delta I$ is the changing current, $V_t$ is the stack voltage, $I_{(t)}$ is the stack current, R is the slope and $P_{Req}$ is the power request signal.

19. The system according to claim 13 wherein the means for generating the current set-point uses the equation:

$$I_{req}^{Stck} = I_{Req(t+1)} = I_{Req(t)} + \Delta I$$

where $I_{req}^{Stck}$ is the current set-point, $I_{Req}$ is a previous current set-point and $\Delta I$ is the change in current.

* * * * *